(12) United States Patent
Wu (10) Patent No.: US 11,091,183 B2
(45) Date of Patent: Aug. 17, 2021

(54) CAMP WAGON

(71) Applicant: Peiwu Wu, Anhui (CN)

(72) Inventor: Peiwu Wu, Anhui (CN)

( * ) Notice: Subject to any disclaimer, the term of this patent is extended or adjusted under 35 U.S.C. 154(b) by 30 days.

(21) Appl. No.: 16/714,797

(22) Filed: Dec. 16, 2019

(65) Prior Publication Data
US 2021/0061331 A1   Mar. 4, 2021

(30) Foreign Application Priority Data

Sep. 3, 2019   (CN) .......................... 201921454355.2

(51) Int. Cl.
*B62B 3/02*         (2006.01)
*B62B 3/00*         (2006.01)

(52) U.S. Cl.
CPC .............. *B62B 3/022* (2013.01); *B62B 3/002* (2013.01); *B62B 2205/06* (2013.01)

(58) Field of Classification Search
CPC ...... B62B 3/022; B62B 3/002; B62B 2205/06
See application file for complete search history.

(56) References Cited

U.S. PATENT DOCUMENTS

| | | | | |
|---|---|---|---|---|
| 9,101,206 B1* | 8/2015 | Chen | ..................... | B62B 5/0013 |
| 9,145,154 B1* | 9/2015 | Horowitz | ................ | B62B 7/008 |
| 9,950,727 B1* | 4/2018 | Pang | ........................ | B62B 3/007 |
| D827,722 S  * | 9/2018 | Sun | .............................. | D21/425 |
| 10,099,712 B1* | 10/2018 | Sun | ......................... | B62B 3/025 |
| 10,435,055 B1* | 10/2019 | Zhu | ........................... | B62B 7/08 |
| 10,501,103 B1* | 12/2019 | Wang | ...................... | B62B 3/025 |
| 10,562,556 B1* | 2/2020 | Horowitz | ................ | B62B 3/007 |
| D894,290 S  * | 8/2020 | Liu | ............................... | D21/425 |
| D905,795 S  * | 12/2020 | McCollum | ..................... | D21/425 |
| 2003/0025301 A1* | 2/2003 | Banuelos, III | .......... | B62B 3/007 280/651 |
| 2010/0090444 A1* | 4/2010 | Chen | ...................... | B62B 3/007 280/651 |
| 2010/0156069 A1* | 6/2010 | Chen | ...................... | B62B 3/007 280/639 |
| 2011/0204598 A1* | 8/2011 | Stevenson | .............. | B62B 3/007 280/639 |
| 2012/0292952 A1* | 11/2012 | Tyson, III | ................ | A47C 1/14 297/129 |
| 2014/0353945 A1* | 12/2014 | Young | .................... | B62B 3/007 280/650 |
| 2015/0035258 A1* | 2/2015 | Chen | ...................... | B62B 3/007 280/651 |
| 2016/0347338 A1* | 12/2016 | Vargas, II | ................ | B62B 3/02 |

(Continued)

*Primary Examiner* — Erez Gurari (57) ABSTRACT

This utility model discloses a type of camp car, including the camp car body. The said camp car body includes the front guardrail and the rear guardrail. The rear end face of the said front guardrail is provided with the front upper side-tube, the front end face of the rear guardrail is provided with rear upper side-tube, and the said front upper side-tube and the said rear upper side-tube are mutually connected. The location near the bottom between the said front guardrail and the said rear guardrail is provided with the supporting plate. The location at middle of the front end face of the said front guardrail is provided with an operation pull-rod. The bottoms of both the said front guardrail and the said rear guardrail are provided with the moving rollers. After end of the operation, this device may be folded and stored.

7 Claims, 9 Drawing Sheets

(56) References Cited

U.S. PATENT DOCUMENTS

| | | | |
|---|---|---|---|
| 2017/0259838 A1* | 9/2017 | Choi | B62B 5/064 |
| 2018/0297622 A1* | 10/2018 | Chen | B62B 3/007 |
| 2018/0327011 A1* | 11/2018 | Horowitz | B62B 5/065 |
| 2019/0023300 A1* | 1/2019 | Fitzwater | B62B 3/02 |
| 2019/0092362 A1* | 3/2019 | Ostergaard | B62B 3/003 |

* cited by examiner

CAMP WAGON

BACKGROUND OF THE INVENTION

This utility model is involved with a type of camp car.

When campers arrive at the camping site through walking or driving car, they usually may build campfire, have barbecue or picnic, or sing in the valley, and by lakeside or seaside, which are the most common camping activities. As the other outdoor enthusiasts, these travelers who frequently conduct these activities are called as the backpacker, and also called as tour pal in mainland of China.

During the camping process, the car is always unable to enter the cap area, hence, many goods such as tents and foods had to be manually handled. However, in general, many goods require handle. In this case, one has no way but to select several back-and-forth handles, which makes people feel tired, and meanwhile generates troubles. Thus, a type of camp car is required to solve the above-mentioned problem.

BRIEF SUMMARY OF THE INVENTION

The technical issue to be solved by this utility model is provision of a type of camp car.

This utility model is realized through the following technical schemes:

A type of camp car includes the camp car body. The said camp car body includes the front guardrail and the rear guardrail, the location at rear end face of the said front guardrail is provided with the front upper side-tube, the location at front end face of the said rear guardrail is provided with rear upper side-tube, and both the said front upper side-tube and the said rear upper side-tube are mutually connected. The location near the bottom between the said front guardrail and the said rear guardrail is provided with the supporting plate, the location at middle of the front end face of the said front guardrail is provided with the operation pull-rod, and the locations at bottom of both the said front guardrail and the said rear guardrail bottom are provided with moving roller.

Optionally, the gap between moving rollers at bottom of front guardrail is smaller than the gap between moving rollers at bottom of rear guardrail.

Optionally, the connection between the said front upper side-tube and the said rear upper side-tube is provided with the upper side-tube connector, the location between the said upper side-tube connector and the said supporting plate is provided with the middle supporting tube, and the middle of the said supporting plate is provided with T-connection piece to coordinate with the said middle supporting tube.

Optionally, the surface of the said middle supporting tube near the middle is provided with the sliding sleeve, both the front side and the rear side of the said sliding sleeve are provided with foldable connection piece, and the said foldable connection pieces are connected with the said front upper side-tube and the said rear upper side-tube respectively.

Optionally, the said sliding sleeve (11) is made of plastic.

Optionally, the location between the said front upper side-tube and the said front guardrail, between the said rear upper side-tube and the said rear guardrail, between the said supporting plate and the said front guardrail, and between the said supporting plate and the said rear guardrail are provided with the triangle-shaped connection piece.

Optionally, the location near the bottom of the said front guardrail and the said rear guardrail is provided with the first supporting plate.

Optionally, the locations between the moving roller and both the said near front guardrail and the said rear guardrail are provided with roller fork and the top of the said roller fork is provided with the roller fast detaching seat.

Optionally, the top of the said roller fork is provided with a connection shaft, the bottom of the said front guardrail is provided with a fixing tube, and the said connection shaft penetrates the said fixing tube and extends to the top of the said fixing tube. The said roller fast detaching seat is set at the end of the said connection shaft, the inside of the said roller fast detaching seat is provided with the adjustment clamping piece, the middles of the bottom of the said adjustment clamping piece and the said roller fast detaching seat are provided with the fixing hole to coordinate with the said connection shaft, the surfaced of the said connection shaft near the top is provided with the ring-shaped clamping groove to coordinate with the said adjustment clamping piece, the inside of the said adjustment clamping piece is provided with the extension ejector, the location between the said extension ejector and the said roller fast detaching seat is provided with the return spring, the other end of the said adjustment clamping piece is provided with the limiting sleeve, the surfaces of the said limiting sleeve and the said adjustment clamping piece are provided with limiting holes, the bottom of the said roller fast detaching seat is provided with the first limiting hole to coordinate with the said limiting hole, the inside of the said first limiting hole is connected with the limiting bolt, and the surface of the said limiting bolt is provided with a spring.

Optionally, the inner side of the said camp bed body is lined with the fabric bag.

The benefits of this utility model are that: this device may help the handle of goods, and during the handle process it may be operated by merely one person, which greatly saves labors. After end of the operation, this device may be folded and stored, which maximizes the reduction of space utilization. This device has rather simple structure, needs low cost and is suitable for popularization.

BRIEF DESCRIPTION OF THE DRAWINGS

In order to clearly show the implementation examples of this utility model or the technical scheme of the prior art, the attached drawings in the implementation example or the description of the prior art are simply described below. Clearly, the attached drawings in the below description are merely some implementation examples of this utility model. For the common technician in this field, he may on basis of these attached drawings obtain other attached drawings without making any creative labor.

DETAILED DESCRIPTION OF THE INVENTION

The characteristics, methods or process-steps disclosed herein may be combined in any form, except for the mutual-exclusive characteristics and/or steps.

Any characteristic disclosed in the description (including any additional claim, abstract and attached drawing), may be substituted by other equivalent substituting characteristics or by other substituting characteristics of the similar purpose, unless it is specially described. i.e. each characteristic is merely one example of the equivalent or similar characteristics, unless it is specially described.

It shall be understood that in the description of this utility model the terms showing the bearing or the position-relationship such as "one end", "the other end", "outside", "upper", "inside", "horizontal", "co-axial", "center", "end", "length", and "outer end" are based on the bearing or the position-relationship indicated in the attached drawings and they are merely for simple description of this utility model, they never specify or imply that the indicated device or element should have the specific bearing and should be constructed and operated with the specific bearing, and thus they shall not be understood as the restriction to this utility model.

In addition, in the description of this utility model, the term "several" means at least two, e.g. two or three, unless otherwise specially restricted.

In this utility model, unless otherwise clearly specified and restricted, the terms "setting", "belling", "connecting", "penetrating" and "inserting" shall be understood from a broad sense, e.g. the fixing connection, detachable connection, or forming an integral, mechanical connection, electrical connection, direct connection, indirect connection through intermediate, inner connection between two elements or mutual action relationship between two elements, unless otherwise clearly restricted. For the common technicians in this field, they may understand the specific meanings of the above-mentioned terms in this utility model as per the specific conditions.

For example, a type of camp car shown in FIG. 1, FIG. 2, FIG. 3, FIG. 4, FIG. 5, FIG. 6, FIG. 7, FIG. 8 and FIG. 9 includes camp car body 20. Camp car body 20 includes front guardrail 2 and rear guardrail 3. The rear end face of front guardrail 2 is provided with front upper side-tube 14, the front end face of rear guardrail 3 is provided with rear upper side-tube 16, both the front upper side-tube 14 and rear upper side-tube 16 are mutually connected, the location near the bottom between front guardrail 2 and rear guardrail 3 is provided with supporting plate 4, the middle of the front end face of front guardrail 2 is provided with operation pull-rod 1, and the bottoms of front guardrail 2 and rear guardrail 3 are provided with moving rollers 6.

In an optimal implementation example of this utility model, the gap between moving rollers 6 on bottom of front guardrail 2 is smaller than the gap between moving rollers 6 on bottom of rear guardrail 3.

In an optimal implementation example of this utility model, the connection between front upper side-tube 14 and rear upper side-tube 16 is provided with upper side-tube connector 13, the location between side-tube connector 13 and supporting plate 4 is provided with middle supporting tube 12, the middle of supporting plate 4 is provided with T-connection piece 9 to coordinate with the said middle supporting tube 12.

In an optimal implementation example of this utility model, the surface of middle supporting tube 12 near the middle is provided with sliding sleeve 11, both the front side and the rear side of sliding sleeve 11 are provided with foldable connection piece 15, and foldable connection piece 15 is respectively connected with front upper side-tube 14 and rear upper side-tube 16.

In an optimal implementation example of this utility model, sliding sleeve 11 is made of plastic.

In an optimal implementation example of this utility model, the locations between front upper side-tube 14 and front guardrail 2, between rear upper side-tube 16 and rear guardrail 3, between supporting plate 4 and front guardrail 2, and between supporting plate 4 and rear guardrail 3 are provided with triangle-shaped connection piece 10.

Provision of the triangle-shaped connection piece will facilitate the folding process.

In an optimal implementation example of this utility model, the locations near the bottom of front guardrail 2 and rear guardrail 3 are provided with first supporting plate 5.

In an optimal implementation example of this utility model, the locations between moving roller 6 and both front guardrail 2 and rear guardrail 3 are provided with roller fork 7, and the top of roller fork 7 is provided with roller fast detaching seat 8.

Setting of the roller fast detaching seat and the roller fork will facilitate the fixing and fast detaching of the moving roller.

Figure 10:
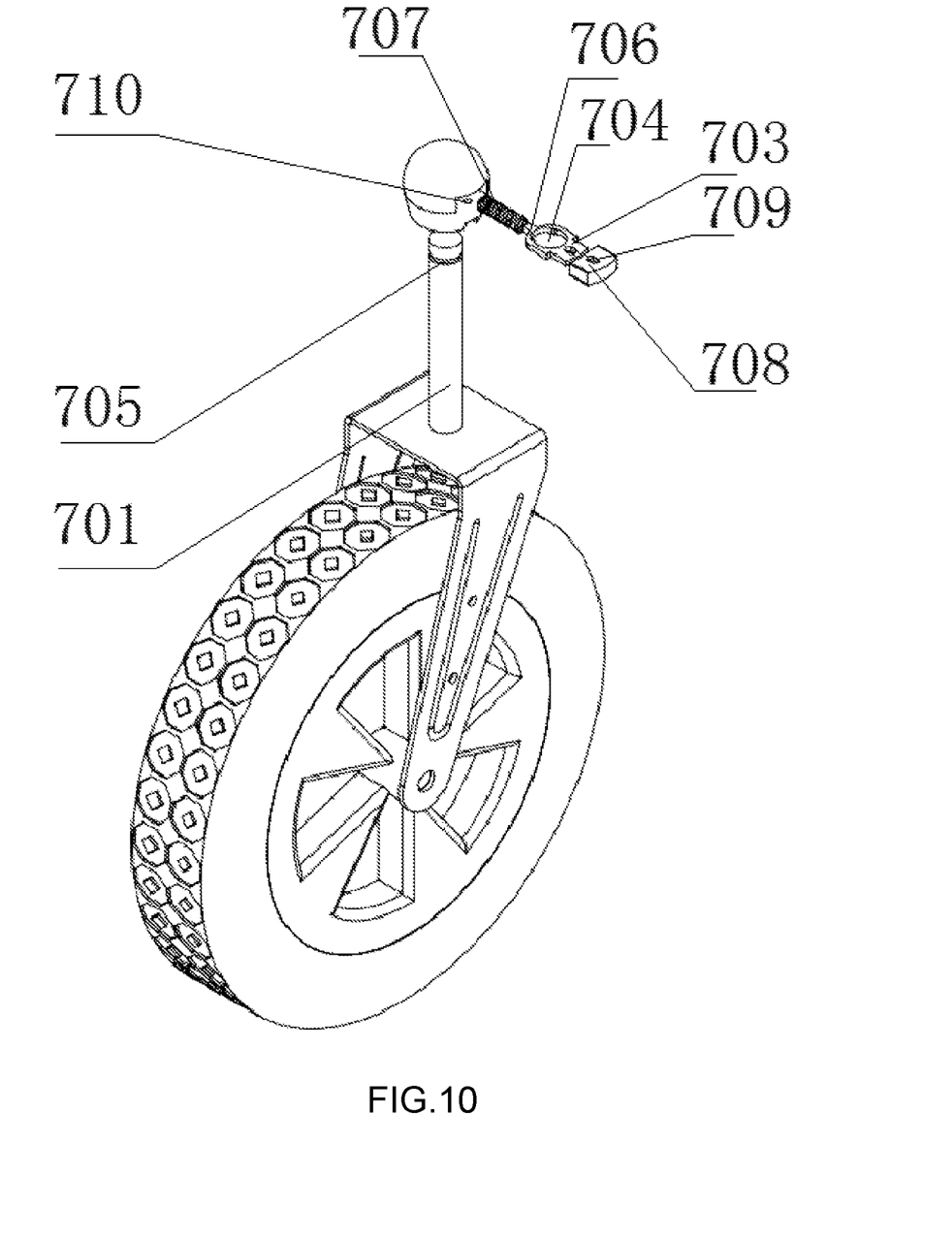
FIG. 10 is the schematic diagram of the roller fast detaching seat.

In an optimal implementation example of this utility model, as shown in FIG. 10, the top of roller fork 7 is provided with connection shaft 701, the bottom of front guardrail 2 is provided with fixing tube 702, and connection shaft 701 penetrates fixing tube 702 and extends to the top of fixing tube 702. The roller fast detaching seat 8 is set at the end of connection shaft 701, the inside of roller fast detaching seat 8 is provided with adjustment clamping piece 703, the middles of the bottoms of adjustment clamping piece 703 and roller fast detaching seat 8 are provided with fixing hole 704 to coordinate with the said connection shaft 701, and the surface of connection shaft 701 near the top is provided with ring-shaped clamping groove 705 to coordinate with adjustment clamping piece 703. The inside of adjustment clamping piece 703 is provided with extension ejector 706, the location between extension ejector 706 and roller fast detaching seat 8 is provided with return spring 707, the other end of adjustment clamping piece 703 is provided with limiting sleeve 708, the surfaces of limiting sleeve 708 and adjustment clamping piece 703 are provided with limiting hole 709, and the bottom of roller fast detaching seat 8 is provided with first limiting hole 710 to coordinate with the said limiting hole 709. The inside of first limiting hole 710 is connected with the limiting bolt, and the surface of the said limiting bolt is provided with the spring.

Under normal condition, the adjustment clamping piece is inserted in the ring-shaped clamping groove to realize the fixation between the roller fast detaching seat and the connection shaft. For detaching, the limiting sleeve is pressed so as to push the adjustment clamping piece to move and indirectly release from the ring-shaped clamping groove, and in turn makes the roller fast detaching seat release from the connection shaft. At that time, one may upwards take out the roller fast detaching seat and downwards take out the moving roller to realize the fast detaching function of the moving roller. Finally, one loosens the limiting sleeve and under the mutual action of the return spring and the limiting bolt makes the adjustment clamping piece return to the home position.

Figure 1:
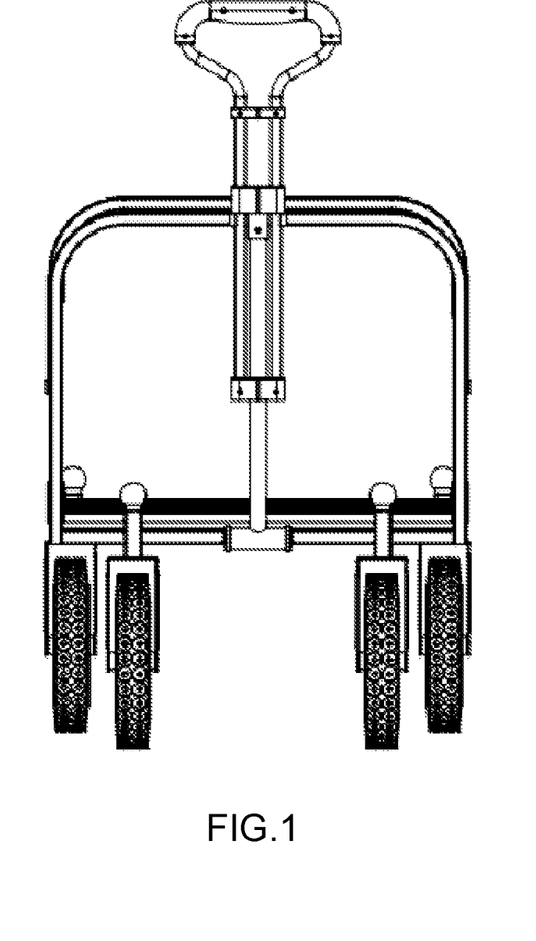
FIG. 1 is the main view of this utility model.
Figure 2:
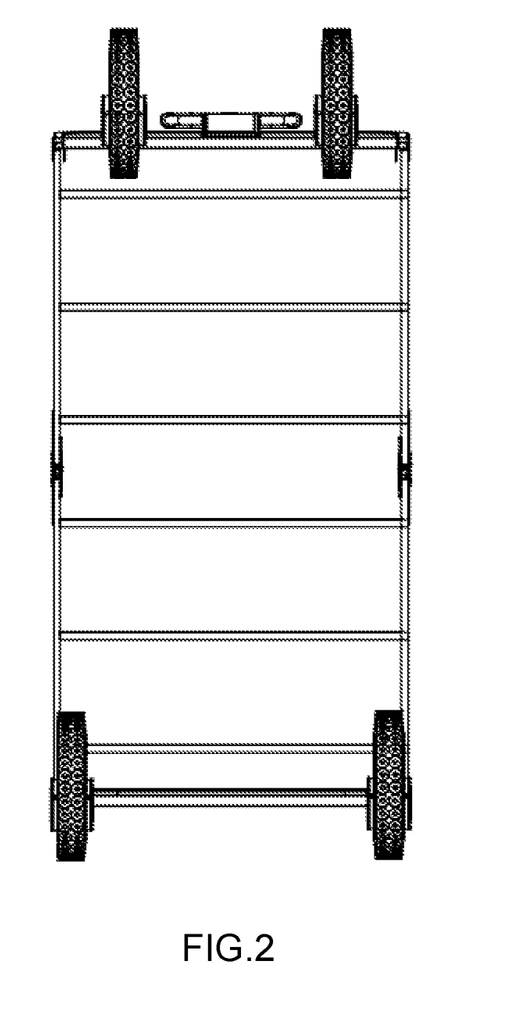
FIG. 2 is the bottom view of this utility model.
Figure 3:
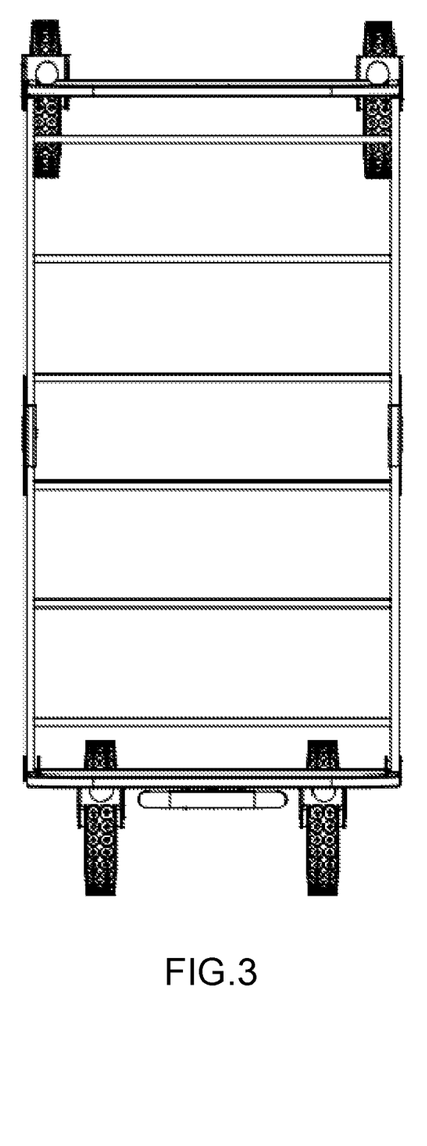
FIG. 3 is the overhead view of this utility model.
Figure 4:
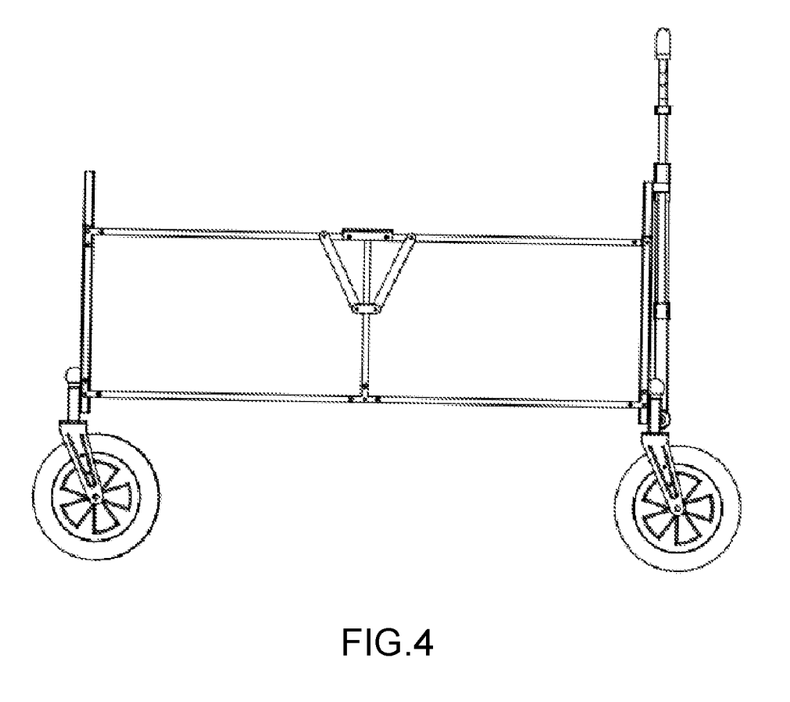
FIG. 4 is the left view of this utility model.
Figure 5:
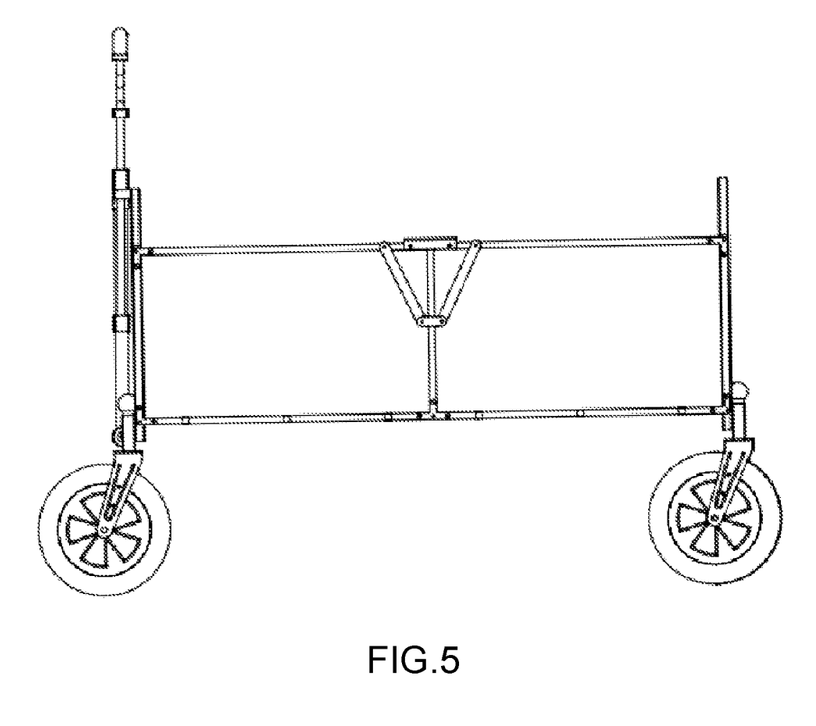
FIG. 5 is the right view of this utility model.
Figure 6:
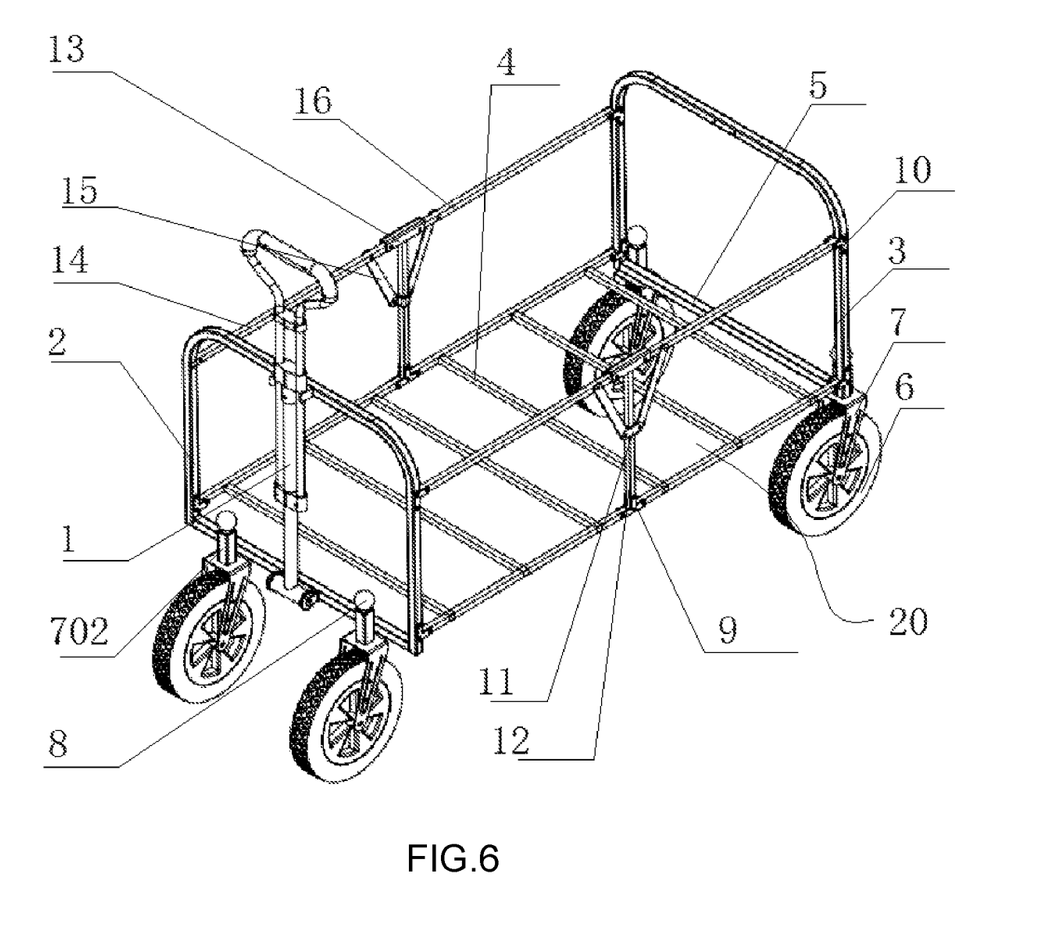
FIG. 6 is the space diagram of this utility model.
Figure 7:
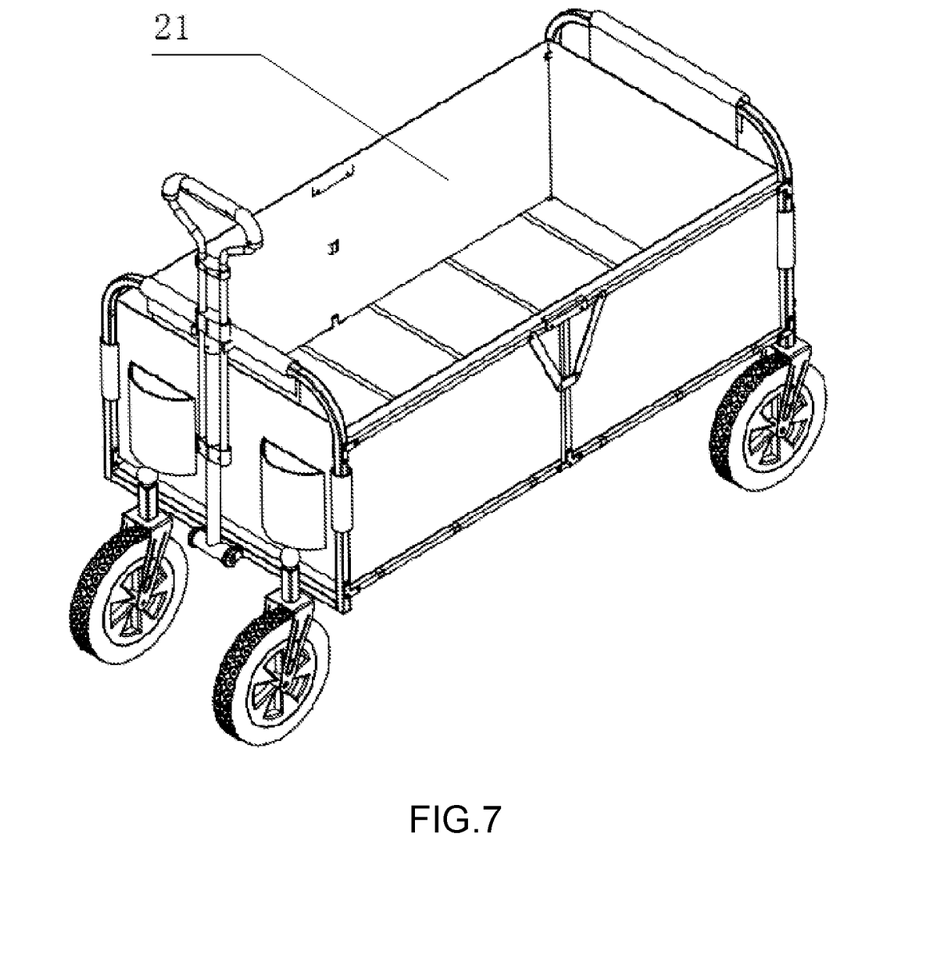
FIG. 7 is the schematic diagram of the fabric bag of this utility model.

In an optimal implementation example of this utility model, the inside of camp bed body 20 is lined with fabric bag 21.

The folding principle and other operations of this device:

1. Change of direction: During the pull process, one may shift the operation pull-rod towards the desired direction and exert the pull force to make the moving roller rotate and in turn change the direction.

Figure 8:
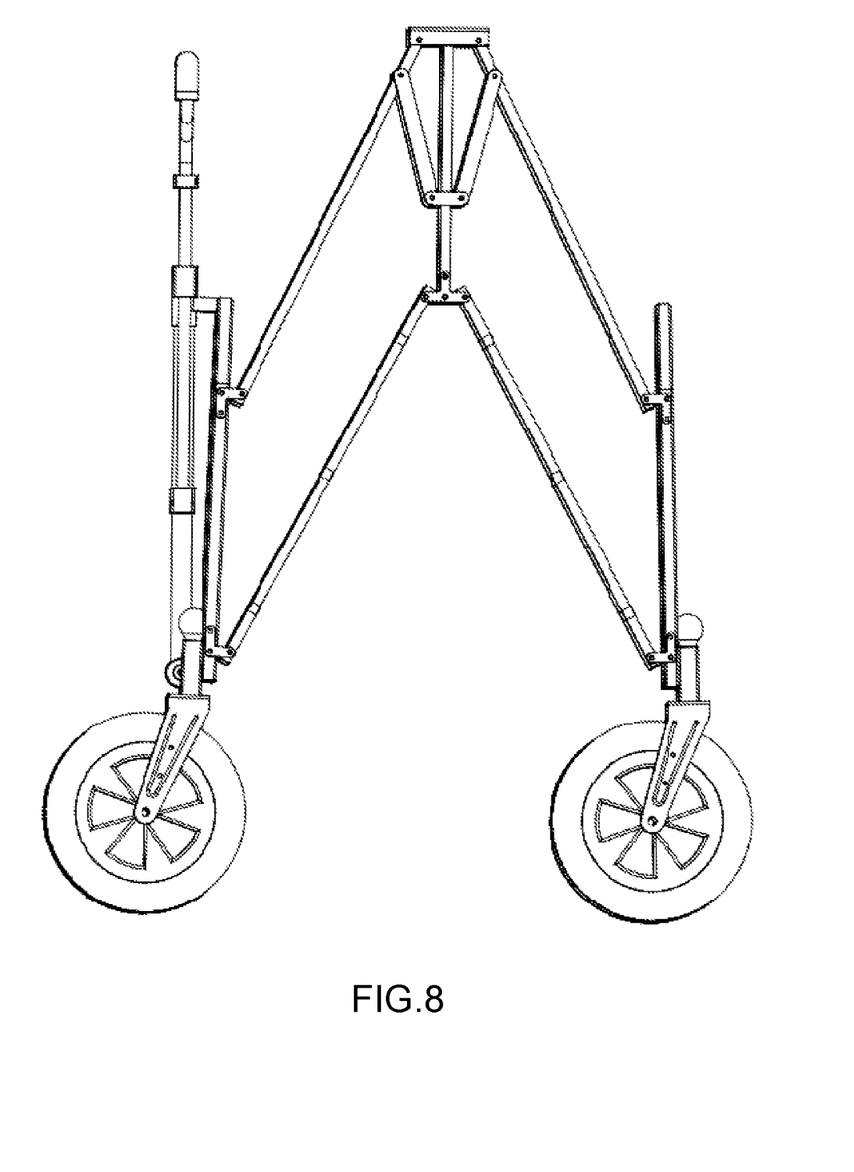
FIG. 8 is the diagram showing the folding state.
Figure 9:
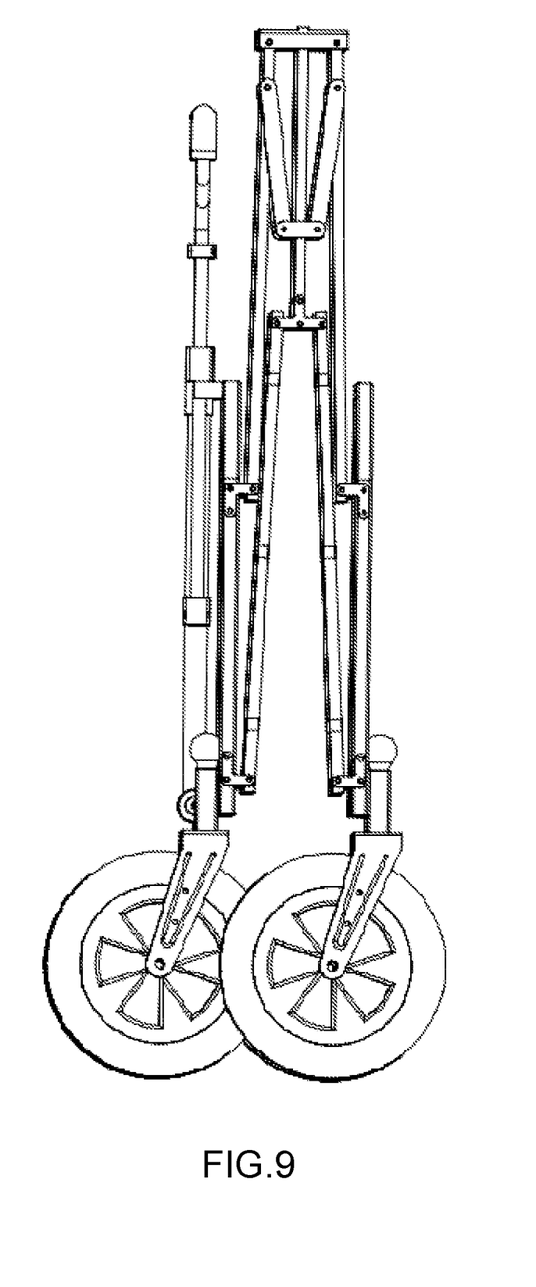
FIG. 9 is the diagram showing the folded state.

2. Folding effect: In case of upwards pulling, under the coordination of the upper side-tube connector, middle supporting tube and T-connection piece, the sliding sleeve will carry the foldable connection piece to downwards slide along the middle supporting tube, finally the front upper side-tube, the rear upper side-tube and the supporting plate downwards and inwards overturn to fold the device.

3. Detaching structure: During the detaching, one may detach the roller fast detaching seat fixed at the top of the roller fork to realize the fast detaching of the moving roller.

The above-mentioned contents are merely the specific implementation modes, and the protection range of this utility model is not merely restricted to the said description. Any change or substitution one desires to obtain without making creative labor is covered within the protection range of this utility model. Hence, the protection range of this utility model shall be based on the range specified in the claims.

What is claimed is:

1. A type of camp wagon, which is characterized that camp car body (20) is included; the camp car body (20) includes front guardrail (2) and rear guardrail (3), the rear end face of front guardrail (2) is provided with front upper side-tube (14), the front end face of rear guardrail (3) is provided with rear upper side-tube (16), front upper side-tube (14) and rear upper side-tube (16) are mutually connected, the location near the bottom between front guardrail (2) and the rear guardrail (3) is provided with supporting plate (4), the middle of the front end face of front guardrail (2) is provided with operation pull-rod (1), and the bottoms of both front guardrail (2) and rear guardrail (3) are provided with moving rollers (6); the connection between front upper side-tube (14) and rear upper side-tube (16) is provided with upper side-tube connector (13), the location between upper side-tube connector (13) and supporting plate (4) is provided with the middle supporting tube (12), the middle of supporting plate (4) is provided with T-connection piece (9) to coordinate with middle supporting tube (12); the surface of the middle supporting tube (12) near the middle is provided with sliding sleeve (11), the front side and the rear side of sliding sleeve (11) are provided with foldable connection piece (15), and foldable connection pieces (15) are respectively connected with front upper side-tube (14) and rear upper side-tube (16).

2. The camp wagon in claim 1, which is characterized that the gap between moving rollers (6) at bottom of front guardrail (2) is smaller than the gap between moving rollers (6) at bottom of rear guardrail (3).

3. The camp wagon in claim 1, which is characterized that sliding sleeve (11) is made of plastic.

4. The camp wagon in claim 1, which is characterized that the locations between front upper side-tube (14) and front guardrail (2), between rear upper side-tube (16) and rear guardrail (3), between supporting plate (4) and front guardrail (2) and between supporting plate (4) and rear guardrail (3) are provided with triangle-shaped connection piece (10).

5. The camp wagon in claim 1, which is characterized that the locations between moving rollers (6) and both front guardrail (2) and rear guardrail (3) are provided with roller fork (7), and the top of roller fork (7) is provided with roller fast detaching seat (8).

6. The camp wagon in claim 5, which is characterized that the top of roller fork (7) is provided with connection shaft (701), the bottom of front guardrail (2) is provided with fixing tube (702), connection shaft (701) penetrates fixing tube (702) and extends to the top of fixing tube (702), roller fast detaching seat (8) is set at the end of connection shaft (701), the inside of roller fast detaching seat (8) is provided with adjustment clamping piece (703), the middles of bottom of adjustment clamping piece (703) and roller fast detaching seat (8) are provided with fixing hole (704) to coordinate with connection shaft (701), the surface of connection shaft (701) near the top is provided with ring-shaped clamping groove (705) to coordinate with adjustment clamping piece (703), the inside of adjustment clamping piece (703) is provided with extension ejector (706), the location between extension ejector (706) and roller fast detaching seat (8) is provided with return spring (707), another end of adjustment clamping piece (703) is provided with limiting sleeve (708), the surfaces of limiting sleeve (708) and adjustment clamping piece (703) are provided with limiting hole (709), the bottom of roller fast detaching seat (8) is provided with first limiting hole (710) to coordinate with limiting hole (709), the inside of first limiting hole (710) is connected with the limiting bolt and the surface of the limiting bolt is provided with the spring.

7. The camp wagon in claim 1, which is characterized that the inside of camp bed body (20) is lined with fabric bag (21).

* * * * *